United States Patent [19]
Yen et al.

[11] Patent Number: 5,531,899
[45] Date of Patent: Jul. 2, 1996

[54] ION EXCHANGE POLYETHYLENE MEMBRANE AND PROCESS

[75] Inventors: Larry Y. Yen, Tewksbury, Mass.; Ven Anantharaman, Salem, N.H.; Bipin Parekh, Chelmsford, Mass.

[73] Assignee: Millipore Investment Holdings Limited, Wilmington, Del.

[21] Appl. No.: 467,259

[22] Filed: Jun. 6, 1995

[51] Int. Cl.$^6$ ................................................ B01D 69/02
[52] U.S. Cl. ........................... 210/638; 210/500.36
[58] Field of Search .................... 210/638, 500.36, 210/500.34, 500.35, 500.43; 264/41, 49

[56] References Cited

U.S. PATENT DOCUMENTS 4,778,601  10/1988  Lopatin et al. ............... 210/500.36 X

*Primary Examiner*—Frank Spear
*Attorney, Agent, or Firm*—Andrew T. Karnakis; Paul J. Cook

[57] ABSTRACT

A composite ultrahigh molecular weight polyethylene microporous membrane is provided having cation exchange capacity. The membrane is useful for removing metal ions from acidic aqueous solutions.

24 Claims, 2 Drawing Sheets

ION EXCHANGE POLYETHYLENE MEMBRANE AND PROCESS

BACKGROUND OF THE INVENTION

This invention relates to composite ultrahigh molecular weight polyethylene membranes having ion exchange capacity, a method for making the membranes and a method for utilizing the membranes to purify aqueous liquids. More particularly, this invention relates to composite ultrahigh molecular weight polyethylene porous membranes containing ion exchange particles which are useful for purifying aqueous liquids and which maintain a desired porosity during contact with an aqueous liquid to be purified.

At the present time, liquids such as aqueous liquids are purified to remove unwanted ions by passing the liquid through a packed column of ion exchange resin beads. In order to improve efficiency of ion removal and rate of processing the liquid, small particle size ion exchange resin beads and high flow rates are desirable. While smaller particle size resin beads improve efficiency in a packed column, they also effect a decrease in the fluid flow rate which, in turn, renders the optimization of the purification process utilizing the beads difficult. A common undesirable phenomenon when using a packed column of beads is the phenomenon of channeling wherein the liquid being purified passes only through a portion of the bed while rendering the remainder of the bed underutilized.

It has been proposed to utilize microporous membranes having ion exchange capacity to replace a packed column of resin beads to effect a desired purification. One means for providing the ion exchange capacity is to form a composite membrane comprising a polymeric microporous matrix and ion exchange particles which are dispersed in the matrix. These membranes can be made relatively thin to thereby increase flow rates therethrough.

At the present time, it is known to incorporate particulate filler materials such as siliceous fillers into ultrahigh molecular weight polyolefins such as polyethylene fibers or filaments as disclosed in U.S. Pat. Nos. 5,093,197 and 5,126,219. The filler materials disclosed by these patents do not have ion exchange capacity. It is also known to form unfilled microporous membranes formed from ultrahigh molecular weight polyethylene as disclosed in U.S. Pat. Nos. 4,778,601 and 4,828,772. It is also known to form heterogeneous compositions from low or medium density polyethylene or high molecular weight high density polyethylene with an ion exchange resin. As disclosed in U.S. Pat. Nos. 5,346,924, these compositions are treated so that they have cracks which are large enough to allow ion passage upon imposition of a voltage gradient but which are too small to allow significant bulk flow of liquid upon imposition of a pressure gradient across the composition.

U.S. Pat. No. 3,876,565 discloses a nonporous composite membrane comprising a polyolefin containing ion exchange particles. The composite resin is formed by blending the polyolefin and the ion exchange particles at a temperature where the polyolefin melts and the ion exchange particles retain their shape. Thereafter, the resulting composition is contacted with hot water to expand the polyolefin into a net-like state. The cells formed by the expansion of the ion exchange resin particles are filled by the particles. This composite membrane is also designed to prevent bulk flow of liquid.

U.S. Pat. Nos. 5,071,610; 5,238,621 and 5,248,428 disclose a composite article comprising polytetrafluoroethylene (PTFE) fibril matrix containing insoluble ion exchange particles. U.S. Pat. No. 5,279,742 discloses the use of a PTFE fibril matrix containing modified solid particles used to preferentially absorb a class of organic compounds from a fluid in order to purify the fluid.

U.S. Pat. No. 5,281,631 discloses a diphosphonic acid modified resin comprising an acrylamide or a styrene together with an acrylonitrile, acrylate or methacrylate. The ion exchange resin is useful for extracting metal ions from a liquid waste stream.

A significant problem associated with incorporating ion exchange resin particles into a polymer matrix is that the resin particles are swellable in aqueous liquids. Thus, when a composite material comprising a polymer binder and the ion exchange resin particles is contacted with water, in the case of a porous membrane composite, the porosity of the composite is significantly reduced thereby significantly reducing the flow rate of the liquid through the porous composite.

Ultrahigh molecular weight polyethylene is a desirable material since it exhibits good chemical resistance to a wide variety of reagents and therefore provides wide flexibility as a material for use in processes involving contact with these reagents such as in purification processes. Hydrofluoric acid, for example is a reagent commonly employed in the treatment of silicon-based materials such as silicon-wafers used as a base to form integrated circuits. A currently available process for purifying hydrofluoric acid is disclosed for example in U.S. Pat. No. 4,952,386. This process is undesirable since it relies upon the use of columns of ion exchange resin beads.

Accordingly, it would be desirable to provide ultrahigh molecular weight porous membranes having ion exchange capacity which has a high ion capture (efficiency) characteristics, has a high ion exchange capacity per unit area and permits maintenance of desirable flow rate per unit area through the membrane when it is wet in aqueous solution. In addition, it would be desirable to provide such membranes which are useful in processing corrosive reagents, including low pH acids such as hydrofluoric acid.

SUMMARY OF THE INVENTION

The present invention provides an ultrahigh molecular weight polyethylene (UHMW-PE) porous membrane containing ion exchange particles which is useful for removing metal ions from aqueous liquids. The membranes of this invention retain desired permeability even when wet, are efficient in capturing ions in solution and have a high ion exchange capacity per unit area.

In one aspect of this invention, a process for preparing the UHMW-PE porous ion exchange membrane is provided to produce membranes having desired permeability when formed and which permits retaining this desired permeability when the membrane is wet with an aqueous liquid. In the process of this invention, a mixture of UHMW-PE and a porogen (diluent) is heated to an elevated temperature to form a solution to which is added ion exchange resin particles having a size of less than about 50 microns and a mean particle size between about 8 and 20 microns. The resultant mixture is formed, shaped and then quenched. It has been found that the quenching temperature has an effect on the permeability of the final membrane. In addition, it has been found that swelling of the ion exchange resin particle in the UHMW-PE matrix will have an effect on the permeability of the wet membrane. Swelling of the particles can be controlled by controlling the degree of cross linking of the polymer forming the particles.

The composite membranes of this invention are particularly useful for removing metal ions from aqueous acids such as hydrofluoric acid, and nitric acid or the like. It has been found that the membranes of this invention are capable of rapidly and substantially completely removing specific cations to low levels of less than about 10 parts per billion (ppb).

DESCRIPTION OF SPECIFIC EMBODIMENTS

Figure 1:
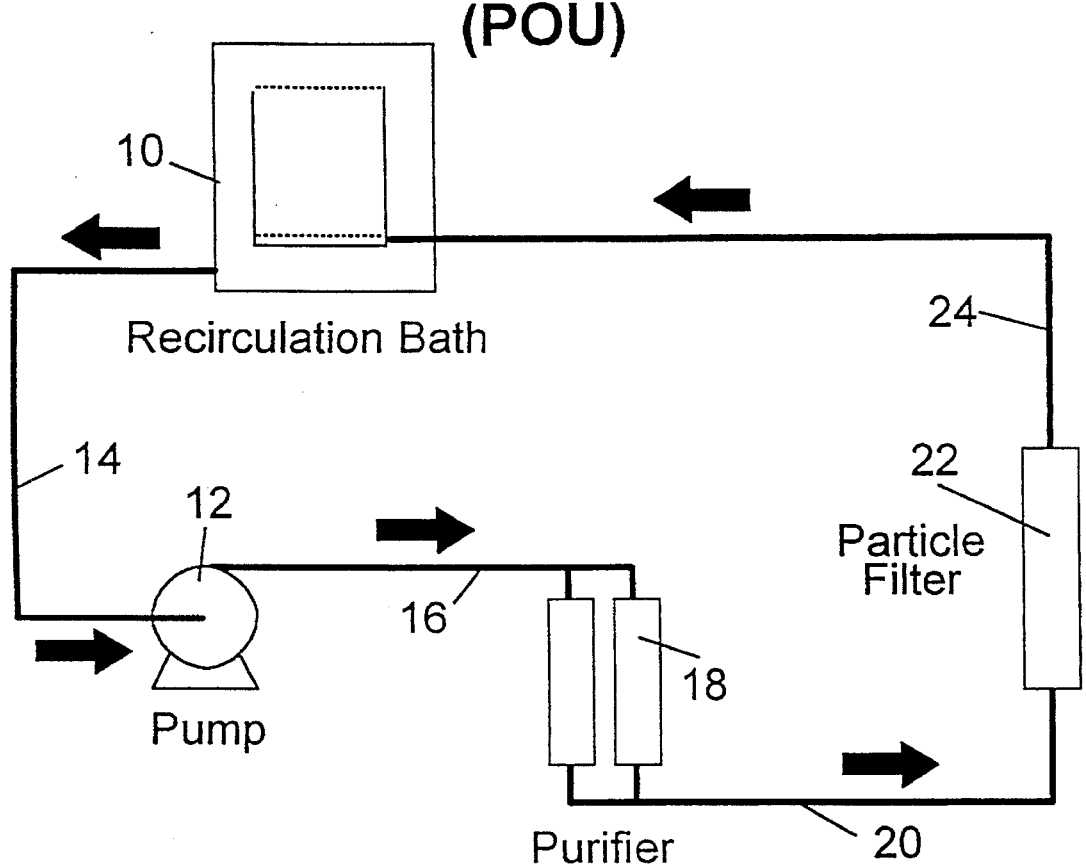
FIG. 1 is a schematic view of a process for purifying an aqueous acid utilizing the membrane of this invention.

The porous membranes of this invention are formed from UHMW-PE having a molecular weight greater than about 1,000,000. Typically UHMW-PE are differentiated from other polyethylenes such as high density polyethylene and low density polyethylene because it displays no measurable flow rate under normal test procedures (See Duling et al., U.S. Pat. No. 3,954,927). UHMW-PE also has significantly enhanced mechanical properties compared to other polyethylenes. These enhanced mechanical properties included abrasion resistance, impact resistance and toughness. Additionally, despite the lack of an exact definition, it is generally accepted that polyethylenes with weight average molecular weight of 1,000,000 or higher are included within the class designated as UHMW-PE. Such molecular weights correspond to an intrinsic viscosity in the range of about 8 or more. Commercially, UHMW-PE is marketed as a white powder by several suppliers. American Hoechst, for example markets an UHMW-PE power under the trademark Hostalen GUR. Himont markets UHMWPE powder under the trademark 1900 and Mitsui markets the polymer under the trademark, Hi-Zex Million.

To form the membranes of this invention, UHMW-PE is mixed with a porogen. The term, "porogen" is employed herein to mean a material which can be mixed with UHMW-PE, heated to an elevated temperature to form a solution or a substantially homogeneous one phase mixture of porogen and polymer, and subsequently cooled to create phase separation with a distinct phase rich in porogen. The distinct phase can be removed from the mixture to create a microporous structure. Preferably, the porogen is a hydrocarbon, since hydrocarbons exhibit relatively good solvency for olefin polymers at elevated temperatures. Aliphatic, alicyclic and aromatic hydrocarbons can be employed as porogens. Hydrocarbons which are liquid and which boil higher than the solution temperature are preferred. Either pure hydrocarbons such as decane and higher homologous or, mixed hydrocarbons of the type normally found in petroleum fractions, such a kerosene, fuel oil or the like can be used. Mineral oil is a particularly preferred porogen. Hydrocarbons which are solids at ambient temperature, such a paraffin wax, also can be used as porogen when they meet the criterion of being a liquid solvent at elevated temperatures. Other polar liquids such as di-2-ethyl hexyl phthalate or dibutyl sebacate can also be employed.

The porogen and UHMW-PE comprising between about 2 and about 20 weight percent UHMW-PE are mixed at elevated temperatures to form a solution. It has been found that solutions containing more than about 20 weight percent UHMW-PE are difficult to process at practical rates because of their high viscosities. On the other hand mixtures containing less than about 2 weight percent UHMW-PE produce solutions which result in microporous membranes in which a significant portion of the microporous structure collapses. Collapse of the microporous structure results in a decrease of the permeability of the membrane. It is preferred to employ solutions containing between about 5 and about 15 weight percent UHMW-PE since they can be readily processed with conventional equipment to produce microporous membranes having outstanding properties.

The mixture of UHMW-PE and the porogen is heated to an elevated temperature to form a solution. The exact temperature required to dissolve the UHMW-PE will depend upon the molecular weight of the UHMW-PE, the porogen and the concentration of polymer present in the mixture. The temperature should not be so high as to cause ion exchange resin decomposition. In general, temperatures of about 190° C. have been found suitable.

The ion exchange resin particles can be added to the UHMW-PE either prior to the porogen, with the porogen or after the UHMW-PE and porogen have been heated to form a solution or during heating of the solution. The resultant mixture containing the ion exchange resin particles then is worked to form a homogeneous composition which then is formed such as by extrusion to form a microporous membrane which can be a film, hollow fibers or the like. The size, degree of resin crosslinking and concentration of resin particles in the UHMW-PE is controlled so that the microporous composite membrane retains its microporosity even when wet. The degree of swelling of the resin composition between the dry state and the wet state after contact with an aqueous solution should be less than about 300%, and most usually between about 200% and 250%. "Swelling" is defined as the ratio of volume of fully water swollen resin to volume of dry resin at room temperature.

Forming is done under moderate shear. Previously, the art has recognized that UHMW-PE is susceptible to degradation by shear. However it has been found that some shear is necessary to provide sufficient mixing for uniform heat distribution across the polymer and to allow more homogeneous mixing and interpenetration of the components forming the polymer composition during processing. The appropriate amount of shear is an amount sufficient to form, in the extrusion apparatus, a homogeneous melt blend of polymer in porogen and well dispersed ion exchange resin particles so that membranes can be extruded so that they do not contain defects such as holes or bubbles and which have strength. However, the amount of shear should be below that which significantly degrades the mechanical properties of UHMW-PE. The amount of shear desired is referred to herein as "moderate."

The amount of shear to which the melt blend being extruded is subjected can be controlled as follows: The shear rate applied to the solution is a function of the design of the extrusion system. In particular, the screw speed and a gap between the screw and barrel wall of the extruder contribute to the shear rate. If more than one screw is employed in the extruder, such as in twin screw extruders, the shear rate is also affected by the distance between the screws, the design of the screws, and their rotational relationship, i.e., co-rotating or counter-rotating. The shear rate can be adjusted by appropriate selection or modification of these extruder parameters. In addition, the amount of shear can be reduced by reducing the residence time of the melt blend in the extruder. For example, the barrel of the extruder can be shortened to reduce the residence time for the composition.

After the resin particles containing melt blend has been formed to shape into a membrane, the membrane is cooled to a temperature sufficient to cause phase separation of the UMHMW-PE solution. Such cooling results in a polymer-rich, porogen-poor phase and a distinct polymer-poor, porogen-rich phase within the membrane. When the porogen is removed form the composition subsequently in the process, the volume previously occupied by porogen comprises the porous volume of the porous membrane of this invention.

Cooling can be effected by any conventional means such as by immersion of the extruded membrane in a cooling bath of liquid such as water. Cooling is carried out at, or below phase separation temperature. Typically, temperatures of below about 100° C. have been employed. The cooling rate of the extruded membrane can also affect the ultimate membrane structure produced. In general, slower cooling rates tend to provide larger pores in the microporous membranes and increased gas and liquid permeability. The length of time the extruded membrane is maintained under cooling conditions also affects the ultimate structure and properties of the microporous membrane produced. Alternatively, cooling gas such as air can be contacted with the extruded membrane or the extruded membrane can be brought into thermal contact with chill rolls or other solid surfaces maintained at cooling temperatures.

After sufficient cooling to form the two phases referred above, a microporous structure in the membrane is created by removing the porogen. A preferred method for removing porogen is by extraction. Extraction can be achieved by immersing the membrane in a bath of suitable extractant liquid, such as hot ethanol, hexane or halogenated solvents.

Because the membrane generally shrinks during porogen removal, it is preferred to restrain the membrane during porogen removal. Such restraint can be employed to minimize dimensional change in the membrane as well as to minimize collapse of the microporous structure.

After porogen removal, the microporous membrane is dried to remove any remaining extractant. This can be done at ambient temperature or by exposing the membrane to elevated temperatures. At elevated temperatures, the microporous membrane can also be strengthened. Temperatures of up to about 130° C. have been found to be suitable. It is also preferred to restrain the membrane during drying to minimize dimensional change and/or collapse of the microporous membrane.

Suitable ion exchange resins comprise anion or cation exchange resins having a particle size of 50 microns or less, preferably between about 10 and about 20 microns. Ion exchange resin particles of this size can be obtained by grinding commercially available resin beads which generally have an average particle size of about 150 to 300 microns. Representative suitable ion exchange resins include sulfonated styrene-divinylbenzene copolymer, phosphonated styrene-divinylbenzene copolymer and carboxylated styrene-divinylbenzene copolymer. Suitable anion exchange resins include tertiary and quartenary amine functionalized styrene-divinylbenzene copolymer. A particularly preferred ion exchange resin is selected from the class of resins described in U.S. Pat. No. 5,281,631 which is incorporated herein by reference. A particularly preferred cation exchange resin comprises a diphosphonic acid-modified styrene based copolymer matrix. It has been found that this polymer should have a degree of swelling of less than about 300% and preferably less than about a 250% It has been found that copolymers of this composition having a degree of swelling of more than about 300% excessively when contacted with water which results in a reduction of permeability of the membrane when the particles are present in a concentration suitable for acceptable ion exchange capacity. Particular ion exchange resin compositions which are suitable in the membranes of this invention include: a copolymer comprising (a) a first polymerizable component selected from the group consisting of vinylidene diphosphonic acid and alkyl/aryl esters of said diphosponic acid; (b) a second polymerizable component selected from the group consisting of an acrylamide and styrene; (c) a third polymerizable component of a monomer selected from the group consisting of acrylonitrile, methyl acrylate and methyl methacrylate; and (d) a fourth polymerizable component of a copolymer selected from the group consisting of a divinylic and a trivinylic cross linking agent; a copolymer comprising (a) a first polymerizable component selected from the group consisting of vinylidene diphosphonic acid and alkyl/aryl esters thereof of from about 5–95 weight percent; (b) a second polymerizable component consisting essentially of styrene from about 1–95 weight percent; (c) a third polymerizable component selected from the group consisting essentially of acrylonitrile of about 10–95 weight percent; and (d) a fourth polymerizable component selected from the group consisting of divinylbenzene of about 5–50 weight percent and 2-ethylhexanol; or a copolymer comprising (a) a first polymerizable component selected from the group consisting of vinylidene diphosphonic acid and alkyl/aryl esters of said diphosphonic acid; (b) a second polymerizable component of an acrylamide; and (c) a third polymerizable component consisting essentially of acrylonitrile.

Suitable ion exchange capacity is obtained with the membrane of this invention when a concentration of resin particles between about 50 and about 95 weight percent, preferably between about 85 and about 91 weight percent. When the resin particles are present at this concentration, the ion exchange capacity of the resulting membrane is at least about 9 μmole/cm$^2$. Furthermore, the ion capture efficiency should be at least about 95%, preferably at least about 98%. The porosity of the wet resin composition is such as to afford a flow rate of aqueous liquid therethrough of at least about 0.3 ml/min/cm$^2$/psi, preferably at least about 1.0 μ/min/cm$^2$/psi.

In one aspect of this invention, a process is provided for purifying acids by removing metallic ions therefrom. The process of this invention is particularly useful for purifying hydrofluoric acid such as hydrofluoric acid utilized to dissolve silica compositions such as quartz or glass. Impure hydrofluoric acid is contacted with the microporous ion exchange membrane of this invention to effect removal of heavy metal ions particularly iron and copper ions and thereafter filtered to remove particulates. Thus purified hydrofluoric acid then is recovered or recycled for further use such as in etching silicon wafers. The commonly encountered ion impurities which are removed from hydrofluoric acid in accordance with this invention include iron, copper, nickel, calcium, cobalt, manganese, zinc, chromium, silver and lead. The purified hydrofluoric acid can be monitored, continuously or periodically for the presence of undesired metal ions therein in order to determine whether the membrane of this invention should be replaced with fresh membrane. Referring to FIG. 1, container 10 contains hydrofluoric acid and a material to be contacted with hydrofluoric acid such as silicon wafers. Spent hydrofluoric acid is pumped by means of pump 12 through conduits 14 and 16 into contact with the membrane purifier 18 of this invention which functions to remove ions in the hydrofluoric acid. The ion-free hydrofluoric acid is passed through conduit 20 into contact with filter 22 of this invention in order to remove particles therefrom. The purified hydrofluoric acid then is recycled through conduit 24 back to container 10 for reuse therein.

The following examples illustrate the present invention and are not intended to limit the same.

EXAMPLE 1

A 5% (w/w) dispersion of UHMW-PE (Mitsui Hi-Zex Million 240S) in mineral oil was prepared at room temperature and admixed with Diphonix™ (Eichrome Industries) cation exchange resin at a ratio of 7:1 by wt. of cation resin to UHMW-PE. The UHMW-PE polymer has a $M_w=2\times10^6$ and a mean particle size of about 120 um. The mineral oil has a viscosity of 68 cst @ 40° C. and a specific gravity of 0.86 at 25° C. The Diphonix™ cation exchange resin contains diphosphonic acid groups chemically bonded in a styrenic-based polymer matrix. The resin's particle size has been reduced by an air-impact pulverizer to a mean size of ~11 μm.

The three component mixture, which has a consistency of a viscous slurry, was fed into a Brabender twin-screw mixed/extruder with a pair of 42 mm slotted counterrotating screws (L/D=6). A Zenith gear pump, a Koch static mixer and a 18 cm wide slot die were also attached to the extruder for extrusion of the melt blend into sheet form. The temperatures of the various extrusion zones were set at between 165° C. and 190° C. The volumetric output of melt blend from the extruder was 46 cc/min. The extruded film was quenched on a rotating chrome plated chill roll where temperature was controlled at 90° C. by circulating constant temperature fluid through it. The quenched film was rolled up at a speed of approximately 3 ft/min by a motorized winder and interleaved with a highly porous light weight polypropylene spunbonded non-woven fabric material.

To extract the mineral oil from the quenched gel membrane, the interleaved roll (approximately 100 feet in length of membrane) was placed in a Baron-Blakslee degreaser containing 1,1-dichloro-1-fluoroethane (Geneslov 2000) for reflux extraction. The extraction time was 48 hrs. It was then dried at room temperature to remove the extractant and further heat-set at 127° C. for 1 hr. During drying and heat-setting, the membrane was restrained by material wound upon itself. This helps to prevent the membrane from experiencing excessive shrinkage during the last two process steps.

The characteristic as of the sample are as follows:

Dry membrane weight=80 gm/m²
Dry membrane thickness=205 um
Wet membrane thickness*=250 um
% increase in membrane's dimension from dry to wet state*
    =6% (machine direction)
    =13.5% (transverse direction)
Water flow rate**=12.5 cc/min/cm²
$Fe^{+++}$removal efficiency ***≧95%
*After prewet in isopropyl alcohol and equilibrated in room temperature water **ASTM Test No. F317-72. A water wet 47 mm diameter membrane disk was die cut and clamped on a filter holder which was set on a vacuum flask. 250 ml of filtered water at 25° C. was poured on the wet membrane inside the holder and a vacuum at 27.5" Hg was applied. Time for the 250 ml of water to pass through the membrane disk was measured.
***Known area of membrane disc, after prewetting with isopropyl alcohol and water, was equilibrated statically with 200 ppb $Fe^{+++}$ spiked 1% hydrofluoric (HF) acid for 24 hours. The 1% HF solution was analyzed for iron by graphite furnace atomic absorption.

EXAMPLE 2

This example illustrates the use of the membrane of this invention to purify in aqueous hydrofluoric acid solution containing metal ions. A hydrofluoric acid solution having pH of ~1.9 and containing 200 ppb iron in ionic form was passed through a device made with a pleated configuration of a membrane prepared by similar method as described in Example 1 and quenched at 101° C. The membrane had a thickness of about 0.008 inch, and a surface area of about 10.5 ft² and contained about 80 grams of cation exchange resin. As shown by the data points 'set A' in FIG. 2, this reduction of iron was observed to occur over a period of about 10 minutes at a flow rate of the impure hydrofluoric acid through the membrane device at about 5.5 gallons per minute. The impure hydrofluoric acid solution was contained in a 9 gallon container.

Figure 2:
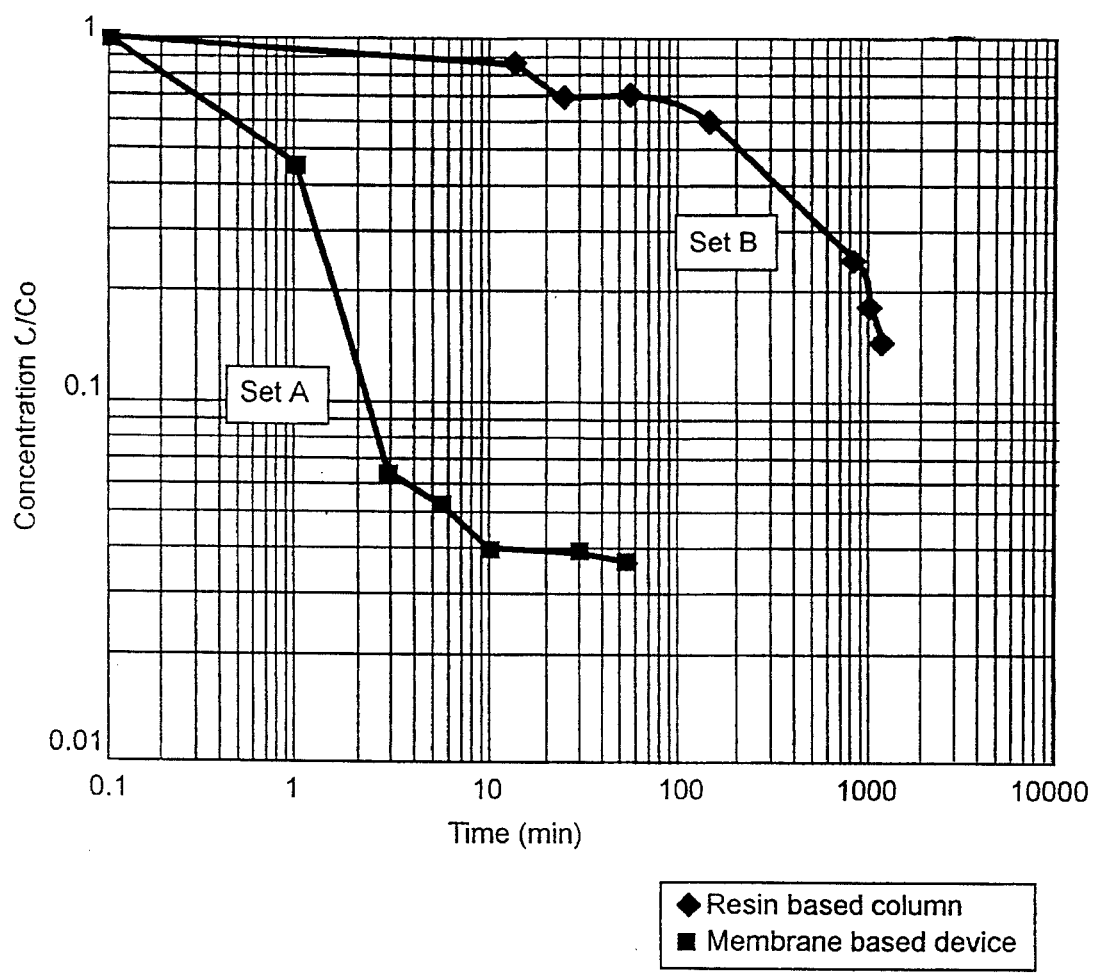
FIG. 2 is a graph comparing the rate of purifying hydrofluoric acid with the process of this invention and with the process of the prior art.

A hydrofluoric acid solution having a pH ~1.9 and containing 200 ppb of iron in ionic form was passed through an ion exchange resin-based device containing about 90 grams of the same cation exchange resin that was incorporated into the membrane of Example 1 and operating under similar operating conditions produced reduction in iron over a period of 20 hours. The data points 'set B' in FIG. 2 show the inferior performance of the resin based device compared to the membrane based device using the membrane of this invention.

We claim:

1. An ion exchange composite membrane comprising a microporous matrix of UHMW-PE and water swellable particles of an ion exchange resin having a particle size between about 3 and about 50 microns, said particles comprising between about 50 and about 95 weight percent of said composition, said matrix retaining its microporous property when immersed in an aqueous liquid.

2. The composite membrane of claim 1 wherein said ion exchange resin particles comprise:
   a) a first polymerizable component selected from the group consisting of vinylidene diphosphonic acid and alkyl/aryl esters of said diphosphonic acid;
   b) a second polymerizable component selected from the group consistent of an acrylamide and a styrene;
   c) a third polymerizable component of a monomer selected from the group consisting of acrylonitrile, methyl acrylate and methyl methacrylate; and
   d) a fourth polymerizable component of a copolymer selected from the group consisting of a divinylic and a trivinylic cross linking agent including exchangeable cations.

3. The composite membrane of claim 1 wherein said ion exchange resin particles comprise:
   a) a first polymerizable component selected from the group consisting of vinylidene diphosphonic acid and alkyl/aryl esters thereof of from about 5–95 weight percent;
   b) a second polymerizable component consisting essentially of styrene from about 1–95 weight percent;
   c) a third polymerizable component selected from the group consisting essentially of acrylonitrile of about 10–95 weight percent; and
   d) a fourth polymerizable component selected from the group consisting of divinylbenzene of about 5–50 weight percent and 2-ethylhexanol.

4. The composite membrane of claim 1 wherein said ion exchange resin particles comprise:
   a) a first polymerizable component selected from group consisting of vinylidene diphosphonic acid and alkyl/aryl esters of said diphosphonic acid;
   b) a second polymerizable component of an acrylamide; and
   c) a third polymerizable component consisting essentially of acrylonitrile.

5. The composite membrane of any one of claims 1,2,3 or 4 wherein said ion exchange particle is a cation exchange resin.

6. The composite membrane of any one of claims 1, 2, 3 or 4 wherein said resin particles include diphosphonic acid groups as a source of exchangeable ions.

7. The composite membrane of any one of claims 1, 2, 3 or 4 wherein said resin particles include diphosphonic acid groups and sulphonic acid groups as a source of exchangeable ions.

8. The process for making the microporous composition of any one of claims 1, 2, 3 or 4 which comprises forming a mixture comprising said ultra high molecular weight polyethylene and a porogen for said polyethylene, heating said mixture to an elevated temperature to form, a solution of said polyethylene and porogen and at a temperature less than that at which decomoposition of said particles occur,
   adding said resin particles to said mixture or solution,
   extruding the solution containing said particles to form a flat sheet or hollow fiber containing said resin particles, cooling said extrudate to cause phase separation resulting in a polymer-rich, porogen poor phase and polymer-poor, porogen-rich phase in said extrudate, forming a microporous membrane by removing porogen from the cooled extrudate and drying the microporous membrane.

9. The process of claim 8 wherein said particles comprise crosslinked styrene divinyl benzene containing ion exchangeable groups.

10. The process of claim 8 wherein said resin particles include diphosphonic acid groups as a source of chelating/exchangeable sites.

11. The process of claim 9 wherein said resin particles include diphosphonic acid groups as a source of chelating/exchangeable sites.

12. The process of claim 8 wherein said resin particles include diphosphonic acid groups and sulfonic acid groups as a source of chelating/exchangeable sites.

13. The process of claim 9 wherein said resin particles include diphosphonic acid groups and sulfonic acid groups as a source of chelating/exchangeable sites.

14. The process for removing metallic ions from a solution containing said ions, said solution having a pH greater than about 1.5 which comprises contacting said solution with the composition containing ion exchange resin particles of any one of claims 1, 2, 3 or 4 and recovering a purified solution depleted of metal ions from said composition.

15. In the process of claim 14 wherein said particles comprise cross linked styrene divinyl benzene containing exchangable groups.

16. The process of claim 14 wherein said resin particles include diphosphonic acid groups as a source of chelating/exchangeable sites.

17. The process of claim 14 wherein said resin particles include diphosphonic acid groups and sulfonic acid groups as a source of chelating/exchangeable sites.

18. The process of claim 15 wherein said resin particles include diphosphonic acid groups and sulfonic acid groups as a source of chelating/exchangeable sites.

19. The process of claim 14 wherein said solution is aqueous hydrofluoric acid.

20. The process of claim 15 wherein said solution is aqueous hydrofluoric acid.

21. The process of claim 16 wherein said solution is aqueous hydrofluoric acid.

22. The process of claim 17 wherein said solution is aqueous hydrofluoric acid.

23. The process of claim 18 wherein said solution is aqueous hydrofluoric acid.

24. The process of claim 19 wherein said solution is aqueous hydrofluoric acid.

* * * * *